United States Patent
Fulton

[15] 3,654,669
[45] Apr. 11, 1972

[54] DOUBLE-LATCH CABLE TIE

[72] Inventor: Ronald T. Fulton, Tinley Park, Ill.

[73] Assignee: Panduit Corporation, Tinley Park, Ill.

[22] Filed: Mar. 31, 1970

[21] Appl. No.: 24,295

[52] U.S. Cl. .................................................24/16 PB
[51] Int. Cl. ..................................................B65d 63/00
[58] Field of Search ...................248/68, 71, 74, 74 PB; 24/81 CC, 20 TT, 206 A, 73.7, 16 PB, 30.5 PB, 73 PB

[56] References Cited

UNITED STATES PATENTS

| 2,450,147 | 9/1948 | Lawry | 248/68 |
| 2,969,216 | 1/1961 | Hallsey | 248/71 |
| 3,114,184 | 12/1963 | Bigaovette | 24/30.5 PB |
| 3,197,829 | 8/1965 | Caveney et al. | 24/16 PB |
| 3,214,808 | 11/1965 | Litwin | 24/16 PB |
| 3,302,913 | 2/1967 | Collyer et al. | 24/73.7 UX |
| 3,463,427 | 8/1969 | Fisher | 24/16 PB |

FOREIGN PATENTS OR APPLICATIONS 643,835  8/1962  Italy.....................................24/16 PB

*Primary Examiner*—Donald A. Griffin
*Attorney*—Prangley, Clayton, Mullin, Dithmar & Vogel

[57] ABSTRACT

A cable tie comprises a flexible strap having a row of teeth on one longitudinal surface thereof and a toothed wedge-shaped head at one end thereof, and a locking frame having a first and second strap-accommodating openings therethrough and being trapped on the strap with the strap in the first opening, the first opening being shaped to simultaneously accommodate the head and the other end of the strap therein with the row of teeth engaging the head to latch the strap in a first loop around a first bundle, the second opening having a detent and a strap-bearing surface therein biased toward each other, the detent engaging the row of teeth when the other end of the strap is received through the second opening for latching the strap in a second loop around a second bundle; several alternative embodiments of detents and strap-bearing surfaces, and a strap having two rows of teeth are also disclosed.

16 Claims, 22 Drawing Figures

PATENTED APR 11 1972

INVENTOR
RONALD T. FULTON
BY
Prangley, Clayton, Mullin,
Dithmar & Vogel
ATTYS.

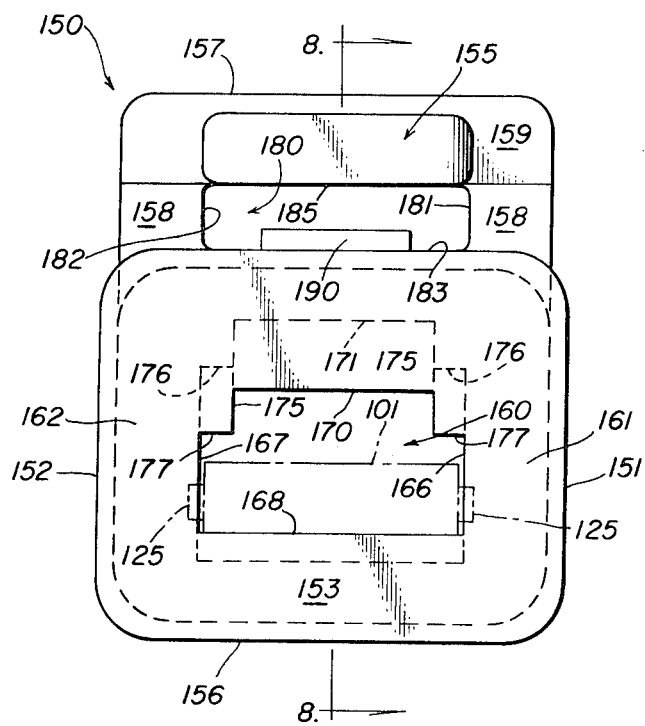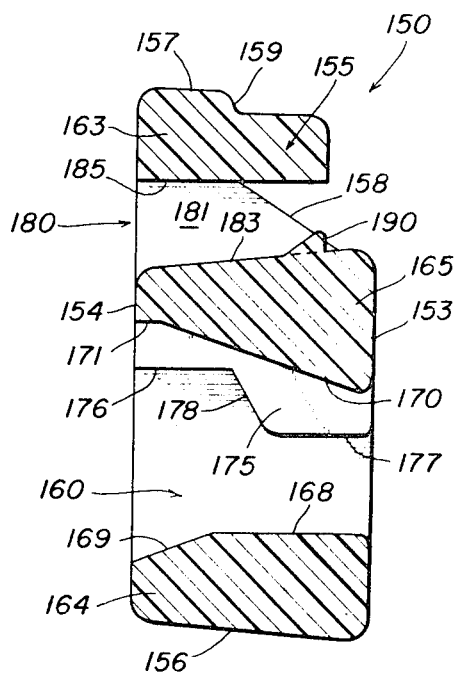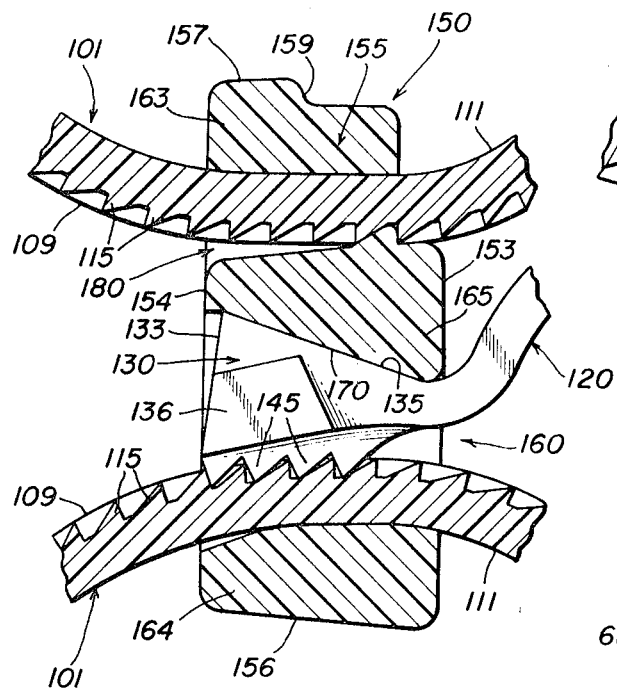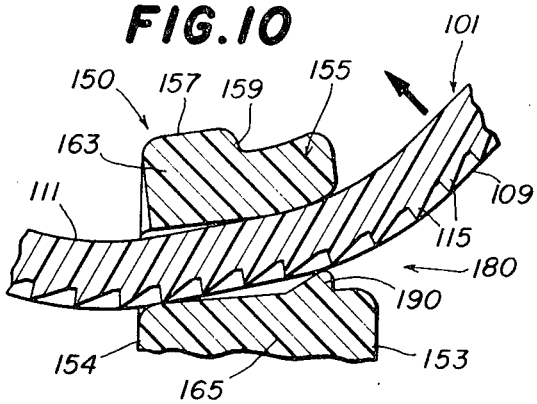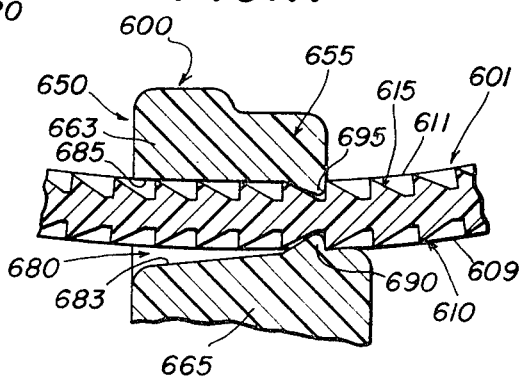

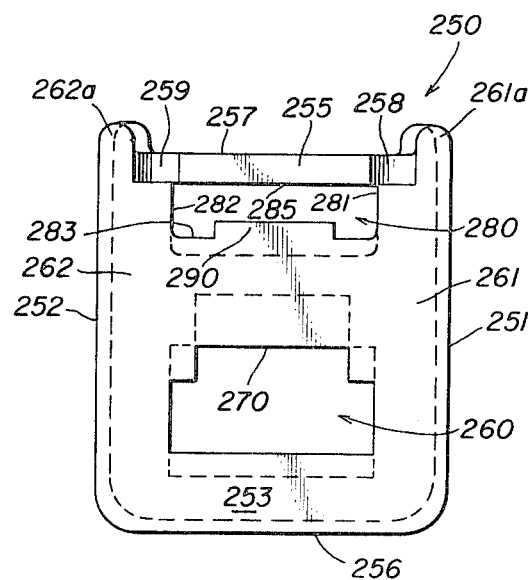
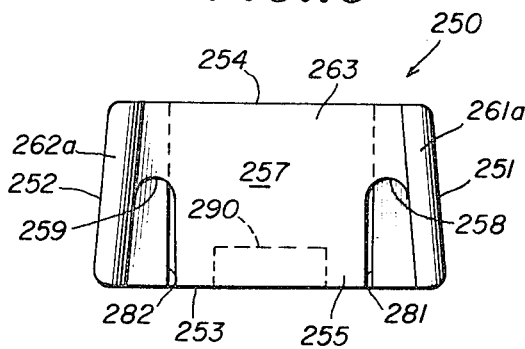
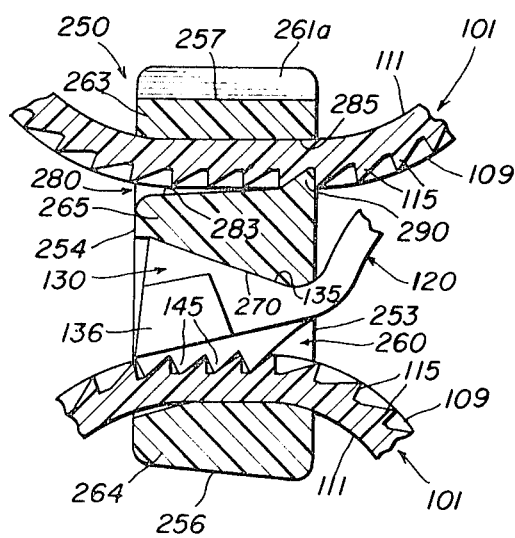
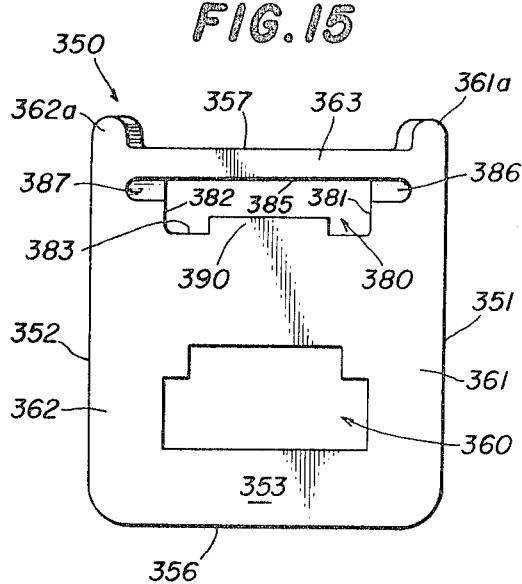
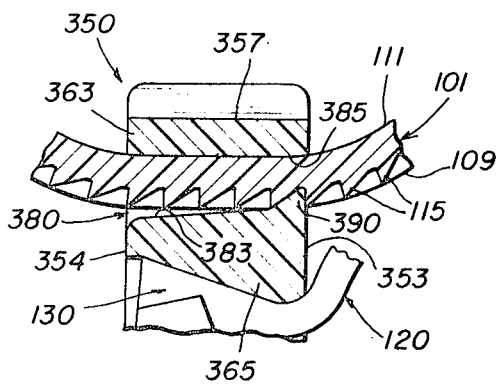
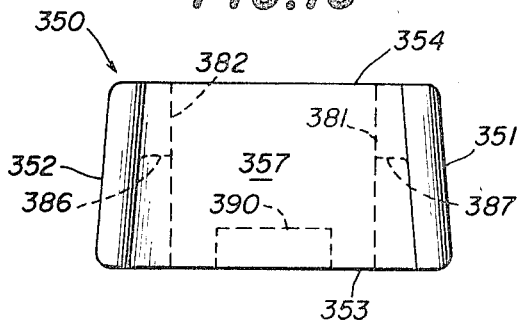

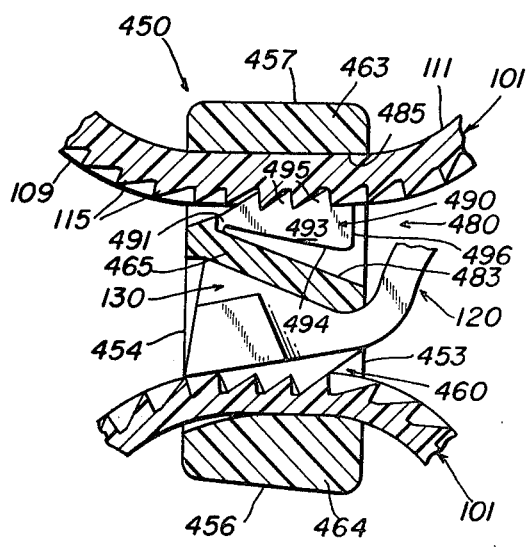
FIG.18
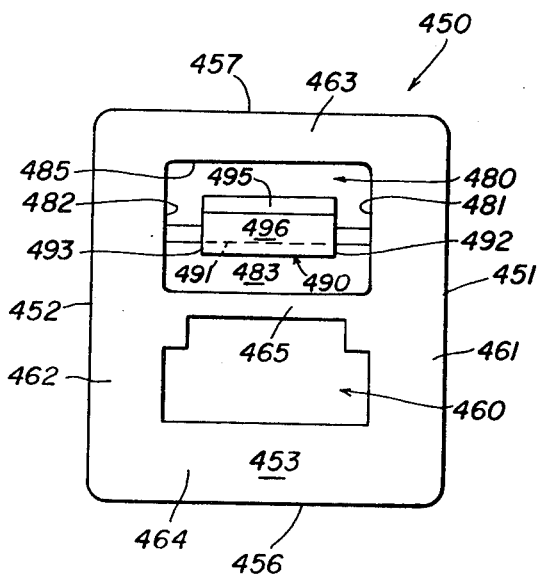
FIG.19
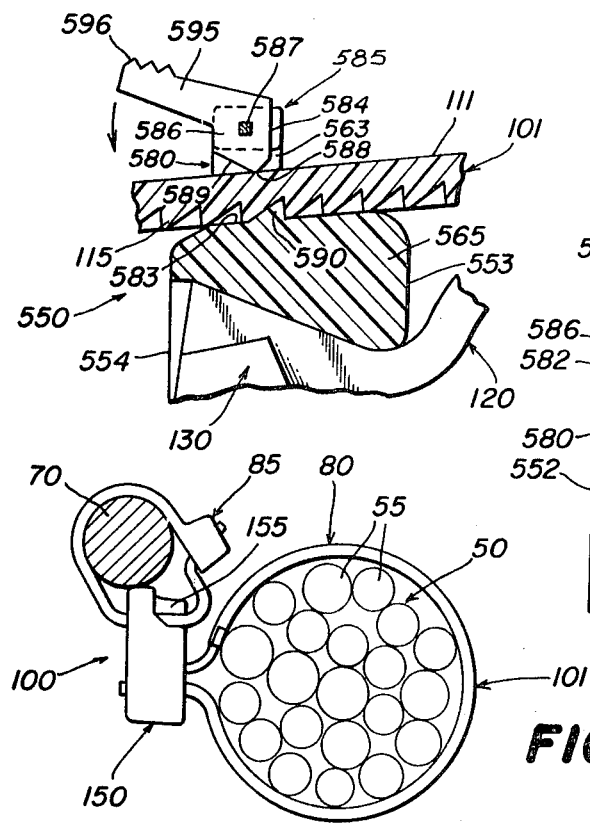
FIG.20
FIG.22
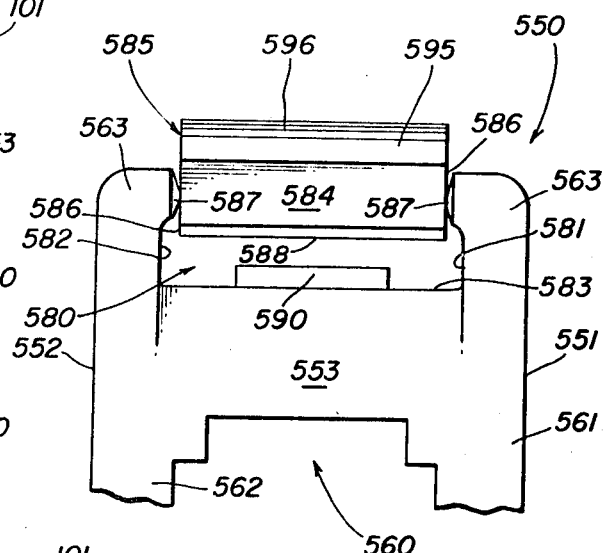
FIG.21

DOUBLE-LATCH CABLE TIE

The present invention is directed to cable ties for binding bundles of wires and the like, and, specifically, to a cable tie for simultaneously tying two separate bundles.

It is an important object of the present invention to provide a cable tie securable about two separate bundles of wires and the like and comprising an elongated flexible strap having an irregular configuration along a portion of the length thereof, a locking frame coupled to the strap adjacent to one end thereof and having first and second strap accommodating openings therein for receiving the other end of the strap therethrough, and first and second detents respectively positioned in the first and second strap accommodating openings and adapted to engage the strap irregular configuration, the strap being deformable into a first loop encircling a first bundle of wires with the other end of the strap extending through the first opening and therebeyond in a first loop-tightening direction, the first detent being disposed toward the strap irregular configuration and engageable therewith when the other end of the strap is extended through the first opening to prevent retrograde movement therebetween, the other end of the strap extending through and beyond the first opening being further deformable into a second loop encircling a second bundle of wires with the other end of the strap extending through the second opening and therebeyond in a second loop-tightening direction, the second detent being disposed toward the strap irregular configuration and engageable therewith when the other end of the strap is extended through the second opening to prevent retrograde movement therebetween, whereby the cable tie serves independently to tie two separate bundles of wires and the like.

It is an important object of the present invention to provide a cable tie to be tensioned or otherwise secured about two separate bundles of wires and the like, the cable tie comprising an elongated flexible strap, a row of teeth disposed on one longitudinal surface of the strap and arranged transversely with respect thereto, a wedge-shaped head connected at the smaller end thereof to one end of the strap and having a tooth disposed transversely thereof and shaped complementary to the teeth in the row of teeth, a locking frame having first and second strap-accommodating openings therein for receiving the other end of the strap therethrough, the first opening being shaped to receive the head therein and to prevent passage of the head therethrough and to simultaneously accommodate the other end of the strap therethrough, the strap being deformable into a first loop encircling a first bundle of wires with the strap accommodated in the first opening and with the other end of the strap extending back through the first opening and therebeyond, the tooth on the head being disposed toward the row of teeth and engageable therewith as the head is pulled into a wedging position in the first opening as when the strap is tightened about the first bundle of wires to a tensioned condition, any force tending to withdraw the strap from the first opening in a strap-loosening direction serving to move the tooth on the head into more firm engagement with the engaged ones of the row of teeth to hold the head firmly in engagement with the frame, a strap-bearing surface on the frame in the second opening and a detent on the frame opposite the strap-bearing surface and disposed transversely thereof and shaped complementary to the teeth in the row of teeth, the strap being further deformable into a second loop encircling a second bundle of wires with the other end of the strap extending through the second opening, the detent being disposed toward the row of teeth and sequentially engageable therewith as the strap is pulled through the second opening when the strap is tightened about the second bundle of wires to a tensioned condition, and means urging the strap-bearing surface and the detent toward one another to move the detent into firm engagement with the engaged ones of the row of teeth to hold the strap firmly in the second opening for preventing retrograde motion of the strap in the second opening, whereby the cable tie serves to tie two separate bundles of wires and the like.

It is another object of this invention to provide a cable tie of the type set forth, wherein the strap-bearing surface is disposed on a flexible bearing member carried by the frame and resiliently urging the strap-bearing surface toward the detent.

It is a further object of this invention to provide a cable tie of the type set forth wherein the detent comprises a pawl hingedly mounted on the frame and extending into the second opening toward the strap-bearing surface, and a tooth on the pawl arranged transversely with respect thereto and shaped complementary to the teeth in the row of teeth and disposed toward the row of teeth and sequentially engageable therewith as the strap is pulled through the second opening in a strap-tightening direction.

Another object of this invention is to provide a cable tie of the type set forth, wherein the strap-bearing surface is disposed on a bearing member mounted on the frame for pivotal movement between a strap-passing position wherein the strap-bearing surface is disposed away from the detent and a strap-locking position wherein the strap-bearing surface is disposed toward the detent, the bearing member being biased into the strap-locking position thereof for urging the strap-bearing surface toward the detent, and further including a release member coupled to the bearing member for effecting movement thereof to the strap-passing position thereof to release the strap from the second opening.

A still further object of this invention is to provide a cable tie of the type set forth, wherein the strap is provided with two rows of teeth respectively disposed on opposite longitudinal surfaces thereof, and wherein the frame is provided with two opposed detents thereon disposed in the second opening transversely thereof and respectively disposed toward the two rows of teeth and sequentially engageable therewith as the strap is pulled through the second opening in a strap-tightening direction, and further including means urging the detents toward each other.

Yet another object of this invention is to provide a cable tie comprising an elongated flexible strap, a row of teeth disposed on one longitudinal surface of the strap and arranged transversely with respect thereto, a head connected to one end of the strap, a locking frame having first and second strap accommodating openings therein for receiving the other end of the strap therethrough, the first opening being shaped to receive the head therein and to prevent passage of the head therethrough, a retaining member carried by the strap adjacent to the one end thereof and engageable with the frame when the strap is accommodated in the first opening and cooperating with the head to trap the frame on the strap, a strap bearing surface on the frame in the second opening, and a detent on the frame opposite the strap bearing surface and disposed transversely thereof and shaped substantially complementary to the teeth in the row of teeth, the strap being deformable into a loop encircling a bundle of wires and the like with the head accommodated in the first opening and with the other end of the strap extending through and beyond the first opening and around the bundle of wires and then through the second opening, the detent being disposed toward the row of teeth and sequentially engageable therewith as the strap is pulled through the second opening for tightening the loop around the bundle of wires, and means urging the strap bearing surface and the detent toward each other to move the detent into firm engagement with the engaged ones of the row of teeth to hold the strap firmly in the second opening for preventing retrograde motion of the strap in the second opening, whereby the cable tie may be effectively secured about a bundle of wires and the like.

Further features of the invention pertain to the particular arrangement of the parts of the cable tie whereby the above-outlined and additional operating features are attained.

The invention, both as to its organization and method of operation, together with further objects and advantages thereof, will best be understood with reference to the following specification taken in connection with the accompanying drawings, in which:

FIG. 7 is an enlarged front elevational view of the locking frame of the cable tie illustrated in FIG. 1;

FIG. 8 is a view in vertical section taken along the line 8—8 in FIG. 7;

FIG. 9 is a view similar to FIG. 8, and showing the cooperation of the locking frame with the cable tie strap in the engaged and tensioned condition of the cable tie;

FIG. 10 is a fragmentary view similar to FIG. 9, and showing the deflection of the locking frame strap-bearing member to accommodate passage of the cable tie strap through the locking frame;

FIG. 11 is a view similar to FIG. 10 and depicting an alternative embodiment of the cable tie of this invention, with two rows of teeth on the strap and two detents on the locking frame;

FIG. 12 is a front elevational view of a second embodiment of the locking frame of this invention for use with the cable tie strap illustrated in FIGS. 1 and 2;

FIG. 13 is a top plan view of the locking frame shown in FIG. 12;

FIG. 14 is a sectional view, similar to FIG. 9, of the locking frame shown in FIG. 13 and also illustrating the cooperation of the cable tie strap therewith;

FIG. 15 is a front elevational view of a third embodiment of the locking frame of this invention for use with the cable tie strap shown in FIGS. 1 and 2;

FIG. 16 is a top plan view of the locking frame shown in FIG. 15;

FIG. 17 is a fragmentary sectional view, similar to FIG. 14, of the locking frame shown in FIG. 16, illustrating the cooperation of the cable tie strap therewith;

FIG. 18 is a sectional view similar to FIG. 14, of a fourth embodiment of the locking frame of this invention for use with the cable tie strap shown in FIGS. 1 and 2, and illustrating the cooperation between the strap and the locking frame;

FIG. 19 is a front elevational view of the locking frame shown in FIG. 18;

FIG. 20 is a fragmentary sectional view, similar to FIG. 18, of a fifth embodiment of the locking frame of this invention for use with the cable tie strap shown in FIGS. 1 and 2, and illustrating the cooperation between the locking frame and the strap;

FIG. 21 is a front elevational view of the locking frame shown in FIG. 20; and

FIG. 22 is a reduced side elevational view of the cable tie according to this invention, illustrating the manner in which it is used in cooperation with a second strap for securing a bundle to a support.

Figure 1:
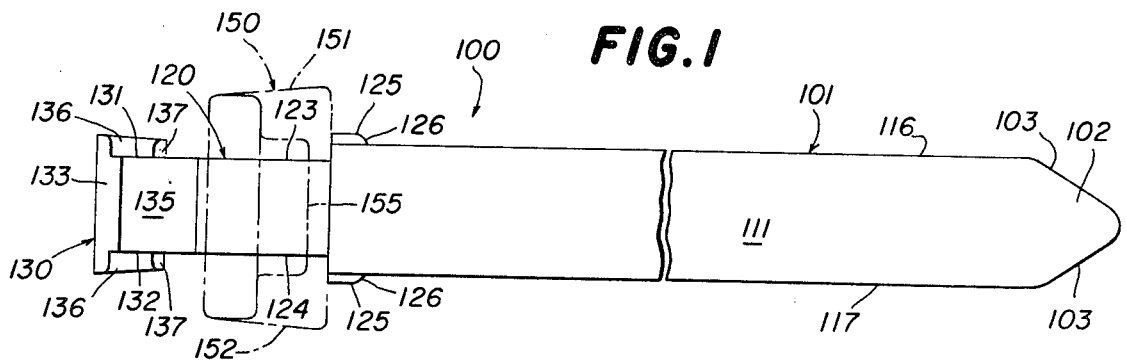
FIG. 1 is a top plan view of a cable tie according to the present invention with a portion of the strap removed and with the locking frame shown in phantom.

Referring to the drawings, and particularly to FIGS. 1 to 10 thereof, there is shown a two-piece cable tie, generally designated by the numeral 100, made in accordance with and embodying the principles of the present invention. The cable tie 100 includes generally a strap 101 having a head 130 connected to one end thereof by a neck 120, and a locking frame 150 trapped on the neck 120 of the strap 101. The cable tie 100 is to be used to bind two separate bundles 50 and 60, respectively formed of a plurality of individual wires 55 and 65, and accordingly the cable tie 100 has been illustrated in this end use. However, it will be appreciated that the cable tie 100 may be advantageously used to bind other objects in a like manner. It will be noted that the cable tie 100 is formed of a suitable synthetic organic plastic resin, the preferred resin being one of the polyamide resins, and must be sufficiently flexible to permit deformation of the several parts thereof as illustrated throughout the drawings.

Figure 2:
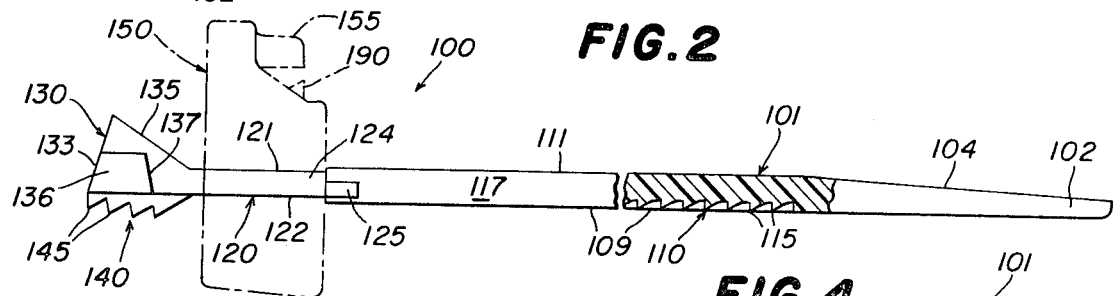
FIG. 2 is a side elevational view of the cable tie illustrated in FIG. 1.

The strap 101 is elongated and flexible and includes an outer end 102 which is provided with tapered sides 103 as well as an inclined surface 104 on the upper side thereof as viewed in FIG. 2, whereby the outer end 102 has reduced dimensions in both the transverse direction and in the thickness thereof. The remainder of the strap 101 is substantially rectangular in transverse cross section and is provided with substantially parallel flat lower and upper surfaces 109 and 111, respectively. The underside 109 of the strap 101, as illustrated in FIG. 2 is provided with an irregular configuration in the form of an essentially continuous row 110 of teeth 115, the teeth 115 extending from and adjacent to the outer end 102 to a point adjacent to the neck 120. Each of the teeth 115 extends transversely of the strap 101 a distance slightly less than the width of the strap 101, the crests of the teeth 115 lying in the plane of the bottom surface 109. The upper surface 111 of the strap 101 is formed smooth and essentially flat as molded. The strap 101 is further provided with a pair of essentially parallel strap sides 116 and 117 that extend the length thereof, i.e., from adjacent to outer end 102 to the neck 120, and respectively interconnected to the upper and lower surfaces 109 and 111 at the opposite side edges thereof.

Integral with the other end of the strap 101 is a reduced neck 120 which is also substantially rectangular in transverse cross section, but has a thickness and width slightly less than the thickness and width of the strap 101. More particularly, the neck 120 is provided with parallel flat upper and lower surfaces 121 and 122, respectively joined at the opposite side edges thereof by a pair of substantially parallel side surfaces 123 and 124. The end of the strap 101 adjacent to the neck 120 is provided on the opposite side surfaces 116 and 117 thereof with a pair of outwardly projecting lugs 125 formed integrally therewith, with the ends 126 of the lugs 125 disposed toward the outer end 102 of the strap 101 sloping inwardly to the corresponding side surfaces 116 and 117.

Integral with the outer end of the neck 120 is a generally wedge-shaped head, generally designated by the numeral 130. The head 130 is provided with a pair of substantially parallel side surfaces 132 respectively coplanar with the side surfaces 123 and 124 of the neck 120. The head 130 is also provided with an inclined end surface 133 extending above the neck 120, and an inclined wedging surface 135 extending downwardly from the upper end of the upper edge of the end surface 133 to the outer end of the upper surface 121 of the neck 120. Protruding outwardly from the side surfaces 131 and 132 respectively of the head 130 are a pair of lugs 136, the outer ends of the lugs 136 being coplanar with the end surface 133 and the inner ends of the lugs 136 respectively defining a pair of inclined abutment surfaces 137. Formed on the bottom of the head 130 is a set 140 of teeth 145, preferably four in number, extending transversely of the head 130 and shaped complementary to the teeth 115 on the strap 101. The crests of the teeth 145 all lie in a plane which is disposed at a slight angle to the lower surface 109 of the strap 101.

Figure 3:
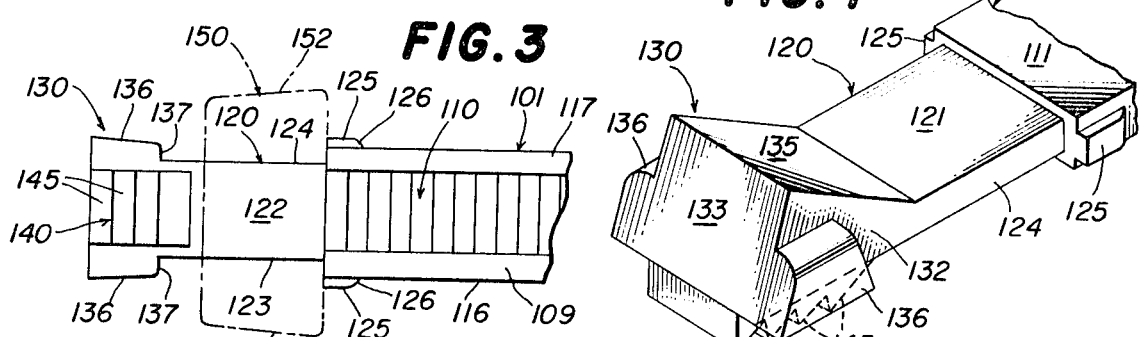
FIG. 3 is a fragmentary bottom plan view of the cable tie shown in FIG. 1.
Figure 4:
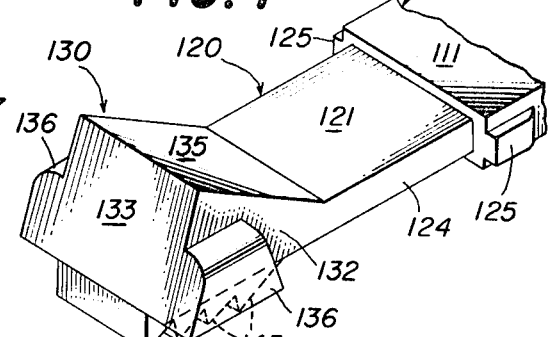
FIG. 4 is an enlarged fragmentary perspective view of the head and neck of the cable tie strap shown in FIG. 1.

The cable tie 100 is also provided with a locking frame, generally designated by the numeral 150, the locking frame 150 being provided with two strap-accommodating openings 160 and 180 therethrough. The locking frame 150 is normally so associated with the strap 101 that the neck 120 is trapped within the opening 160 in the locking frame 150 as indicated in FIGS. 1 to 3 of the drawings, the side of the locking frame 150 disposed toward the outer end 102 of the strap 101 in this normal arrangement being hereinafter referred to as the forward or front side of the locking frame 150. The locking frame 150 is generally in the form of a block and is provided with a front surface 153 and a rear surface 154 disposed substantially parallel to each other and interconnected at the opposite side edges thereof by a pair of opposed side surfaces 151 and 152 which converge slightly toward the rear surface 154. The locking frame 150 is also provided with a flat bottom surface 156 sloping upwardly from the front surface 153 to the rear surface 154, and a flat top surface 157 disposed substantially normal to the front and rear surfaces 153 and 154, but extending only a short distance forwardly of the rear surface 154. The upper front end of the locking frame 150 is recessed or cut away to form an upstanding surface 159 extending downwardly from the top surface 157 substantially parallel to the rear surface 154 a short distance forwardly thereof, and an inclined surface 158 connecting the front surface 153 to the lower end of the surface 159. Projecting forwardly of the surface 159 and integral therewith is a bearing tab 155 overlying the inclined surface 158 and terminating in a forward distal end disposed a slight distance rearwardly of the front surface 153. The bearing tab 155 is substantially rectangular in transverse cross section and extends transversely of said locking frame a distance less than the transverse width of the locking frame 150. The bearing tab 155 is flexible so that the forward end thereof may be deflected upwardly with respect to the rearward end thereof, as will be described more fully hereinafter.

Extending through the locking frame 150 from the rear end to the front end thereof, are the strap-accommodating openings 160 and 180, the opening 160 being disposed toward the bottom of the locking frame 150 and extending from the rear surface 154 to the front surface 153, and the opening 180 being disposed toward the upper end of the locking frame 150 and extending therethrough from the rear surface 154 to the inclined surface 158. The strap-accommodating openings 160 and 180 cooperate to divide the locking frame 150 into a pair of opposed upstanding side walls 161 and 162, respectively interconnected at the upper and lower ends thereof by a top wall 163 and a bottom wall 164 substantially parallel to each other, the side walls 161 and 162 also being interconnected intermediate the upper and lower ends thereof by a center wall 165 separating the opening 160 from the opening 180. The lower opening 160 is defined by a pair of upstanding substantially parallel side surfaces 166 and 167, a bottom bearing surface 168 having an inclined entry portion 169 at the rear end thereof, and an upper wedging surface 170 inclined upwardly from the front surface 153 toward the rear surface 154, the upper end of the wedging surface 170 being connected to the rear surface 154 of the locking frame 150 by a short flat surface 171 disposed substantially parallel to the top surface 157. Respectively formed on the upper ends of the side surface 166 and 167, and extending inwardly therefrom into the opening 160 are a pair of shoulders 175, each of the shoulders 175 having a stepped lower surface comprising a rear upper portion 176 substantially parallel to the top surface 157, a front lower portion 177 substantially parallel to the rear upper portion 176, and an inclined abutment portion 178 interconnecting the forward end of the upper portion 176 with the rearward end of the lower portion 177.

The upper opening 180 is defined by a pair of substantially parallel upstanding side surfaces 181 and 182, a lower strap-engaging surface 183 and an upper strap-bearing surface 185, the strap-bearing surface 185 is substantially parallel to the top surface 157 of the locking frame 150, the front portion of the strap-bearing surface 185 forming the bottom surface of the bearing tab 155. The strap-engaging surface 163 is inclined upwardly with respect to the strap-bearing surface 185 from the rear surface 154 to the front surface 153 of the locking frame 150, with the front end of the opening 180 being shaped and dimensioned complementary to the strap 101. Integral with the strap-engaging surface 183 a short distance rearwardly of the front surface 153 is a tooth or detent 190 extending transversely of the locking frame 150 and shaped complementary to the teeth 115 on the strap 101. The detent 190 is positioned directly opposite the front end of the bearing tab 155, the clearance between the strap-bearing surface 185 and the strap-engaging surface 183 at the base of the detent 190 being substantially equal to the thickness of the strap 101.

In operation, the strap 101 is first assembled with the locking frame 150 by inserting the front end 102 of the strap 101 into the lower opening 160 in the locking frame 150 from the rear end thereof and pulling the strap 101 through the opening 160 until the locking frame 150 snaps into position on the neck 120. It will be noted that the transverse dimension between the outer surfaces of the lugs 125 is slightly greater than the distance between the side surfaces 166 and 167 of the opening 160, whereby passage of the locking frame 150 over the lugs 125 will be impeded. However, because of the sloping forward surfaces 126 of the lugs 125, and because of the resiliency of the lugs 125 and the locking frame 150, the locking frame 150 may be snapped over the lugs 125 into position on the neck 120. But because of the untapered rear end surfaces of the lugs 125, the locking frame 150 cannot be passed back over the lugs 125 toward the outer end 102 of the strap 101. It will also be noted that the maximum thickness of the head 130 (from the top of the rear surface 133 to the crests of the teeth 145) is greater than the distance between the bearing surface 168 and the wedging surface 170 at the narrow front end of the opening 160; in addition, as the head 130 is pulled into the opening 160, the abutment surfaces 137 of the lugs 136 will respectively engage the abutment portions 178 of the shoulders 175, whereby the head 130 cannot be passed through the opening 160. Thus, once assembled as described above, the locking frame 160 is trapped on the neck 120 of the strap 101. It will be observed that the length of the neck 120 is slightly greater than the distance of the front and rear surfaces 153 and 154 of the locking frame 150, whereby a certain amount of play is permitted between the strap 101 and the locking frame 150 in their assembled condition.

Figure 5:
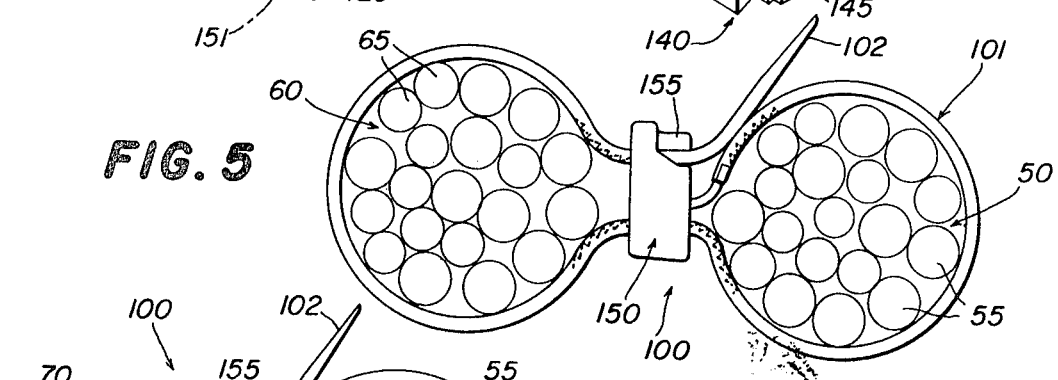
FIG. 5 is a reduced side elevational view of a cable tie according to the present invention illustrating the manner in which the cable tie is used to tie two separate bundles.
Figure 6:
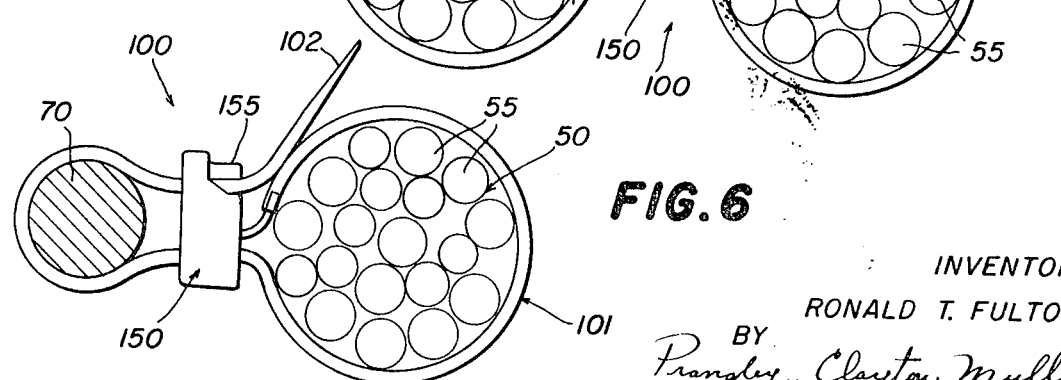
FIG. 6 is a side elevational view, similar to FIG. 5, of a cable tie according to the present invention and illustrating the manner in which the cable tie is used to attach a bundle to a support.

In use, the outer end 102 of the strap 101 is deformed into a loop encircling an associated bundle 50 of wires 55 or the like, with the teeth 115 disposed inwardly against the bundle 50, as illustrated in FIG. 5. The outer end 102 of the strap 101 is then threaded back through the opening 160 in the locking frame 150 beneath the neck 120 and is pulled therethrough until the strap 101 has been tightened to a predetermined tension about the bundle 50. This tensioning operation may be performed by hand or, if desired, by an appropriate tensioning tool which automatically terminates the tensioning operation at the predetermined tension or otherwise indicates that the predetermined tension has been reached. As the outer end 102 of the strap 101 is pulled in a strap-tensioning direction through the opening 160 the head 130 is pulled into the opening 160, with the wedging surface 135 thereon in wedging engagement with the wedging surface 170 of the locking frame 150, and with the teeth 145 of the head 130 in engagement with the teeth 115 of the strap 101, and with the abutment surface 137 of the lugs 136 abutting against the abutment portions 178 of the shoulders 175. When the tensioned strap 101 is released, the tension therein will tend to pull the head 130 and the engaged portion of the strap 101 further into the opening 130 toward the bundle 50, thus more firmly wedging the head 130 into engagement with the locking frame 150, and into engagement with the engaged ones of the teeth 115 of the strap 101, to firmly lock the strap 101 in the locking frame 150 and about the bundle 50.

The outer end 102 of the strap 101 which has been pulled back through the opening 160 as described above may then be looped around a second bundle 60 of wires 65 or the like, with the teeth 115 of the strap 101 disposed inwardly against the bundle 60 as illustrated in FIG. 5. After being looped about the second bundle 60, the outer end 102 of the strap 101 is then inserted into the second opening 180 in the locking frame 150 and fed therethrough toward the first bundle 50. As explained above, the distance between the strap-bearing surface 185 and the strap-engaging surface 183 at the forward end of the bearing tab 155 is substantially equal to the thickness of the strap 101, whereby the detent 190 will impede the passage of the strap 101 through the second opening 180. However, the bearing tab 155 is flexible and is deflectable upwardly away from the strap-engaging surface 183 by the pressure of the surface 111 of the strap 101 thereagainst, as illustrated in FIG. 10. Thus, the teeth 115 on the strap 101 are permitted to rachet over the detent 190 as the strap 101 is pulled through the second opening 180 in a strap-tightening direction. The deflection of the bearing tab 155 comprises a composite motion, viz., a simple deflection of the forward or free end of the bearing tab 155 about the rear connected end thereof, as well as a torsional movement of the entire top wall 163, including the bearing tab 155, of the locking frame 150 about the transverse axis of the rear end thereof, as illustrated in FIG. 10, both of these motions being accommodated by the resilient and flexible construction of the locking frame 150. The strap 101 is pulled through the opening 180 in a strap-tightening direction until it has been tightened to a predetermined tension about the second bundle 60. Upon release of the strap 101 in this tensioned condition, the tension therein will tend to pull the strap 101 in a strap-loosening direction back through the opening 180, thus urging the engaged one of the teeth 115 into more firm engagement with detent 190 for preventing retrograde motion of the strap 101 through the opening 180 and securely locking the strap 101 in the locking frame 150 and about the second bundle 60.

It will be noted that the first loop may be completely formed and tensioned about the bundle 50 before the formation of the second loop about the bundle 60. This facilitates the tensioning of the first loop, since the outer end 102 of the strap 101, which is free and unencumbered by the bundle 60 may be more easily grasped to perform the tensioning operation.

While the principal intended use of the cable tie 100 is for tying two separate bundles of wires or the like or, stated another way, for securing one bundle to another bundle, all as illustrated in FIG. 5, it will be apparent that the cable tie 100 may also be used to secure a bundle 50 to any desired support. Thus, referring to FIG. 6 there is there illustrated the use of the cable tie 100 for tying a bundle 50 and securing the bundle 50 to a support member 70. In this use of the cable tie 100, a strap 101 is secured about the bundle 50 in the manner described above with respect to FIG. 5, and the outer end 102 of the strap 101 is then looped about the support 70 and locked in the second opening 180 in exactly the same manner as the strap 101 was looped about the second bundle 60 as described in connection with FIG. 5.

Referring now to FIGS. 12 to 14 of the drawings, there is there illustrated a second embodiment 250 of the locking frame of this invention for use with the strap 101 illustrated in FIGS. 1 and 2. The locking frame 250 is similar to the locking frame 150 and includes a front surface 253 and a rear surface 254 substantially parallel to the front surface 253, and a pair of opposed side surfaces 251 and 252 interconnecting the front and rear surfaces 253 and 254 at the opposed side edges thereof and converging slightly toward the rear surface 254. The locking frame 250 is also provided with a bottom surface 256 which slopes upwardly from the front surface 253 of the rear surface 254, and a flat top surface 257 disposed substantially normal to the front and rear surfaces 253 and 254. The top surface 257 is recessed a slight distance below the upper ends of the side surfaces 251 and 252, as is best illustrated in FIGS. 12 and 14. The locking frame 250 is also provided with lower and upper openings 260 and 280 respectively therethrough, the lower opening 260 being identical to the lower opening 160 in the embodiment of FIGS. 1 to 10. The openings 260 and 280 combine to divide the locking frame 260 into a pair of upstanding side walls 261 and 262 interconnected adjacent to the upper and lower ends thereof by a top wall 263 and a bottom wall 264, respectively, and interconnected intermediate the ends thereof by a center wall 265 which separates the opening 260 from the opening 280. As indicated above, the top surface 257 is recessed below the upper ends of the side surfaces 261 and 262, whereby the upper ends of the side walls 261 and 262 extend a short distance above the top surface 257 and define a pair of ridges 261a and 262a bordering the side edges of the top surface 257. The front end of the top wall 263 is recessed at the opposite side edges thereof to form a pair of notches 258 and 259 which extend substantially parallel to the side walls 261 and 262 and terminate in arcuate rear ends disposed approximately midway between the front and rear surface 253 and 254.

The bottom portion of the locking frame 250 including the center wall 265, the bottom opening 260 and the bottom wall 264, is identical to the corresponding bottom portion of the locking frame 150 in FIGS. 1 to 10 and will, therefore, not be described again in detail. The upper opening 280 is defined by a pair of opposed upstanding side surfaces 281 and 282, a strap-engaging surface 283 and a strap-bearing surface 285. The strap-bearing surface 285 is substantially parallel to the top surface 257 and extends the length of the opening 280 from the rear surface 254 to the front surface 253. The strap-engaging surface 283 is inclined slightly upwardly from the rear surface 254 toward the front surface 253 and is provided at the front end thereof with a tooth or detent 290 extending into the opening 280 toward the strap-bearing surface 285. The front end of the opening 280 is shaped and dimensioned complementary to the strap 101, with the distance between the front end of the bearing surface 285 and the base of the detent 290 being substantially equal to the thickness of the strap 101. It will be noted that the side surfaces 281 and 282 are respectively disposed a slight distance outwardly of the inner edges of the notches 258 and 259, whereby communication is provided between the notches 258 and 259 and the opening 280 at the front end thereof. The portion of the top wall 263 disposed between the notches 258 and 259 defines a flexible bearing tab 255 which is deflectable with respect to the rear end of the top wall 263.

In operation, the locking frame 250 cooperates with the strap 101 in a manner substantially the same as the locking frame 150 cooperates with the strap 101. More particularly, locking frame 250 may be trapped on the strap 101 in the same manner as was described with respect to the locking frame 150. The strap 101 may then be looped about a first bundle of wires or the like (not shown) and fed back through the opening 260 to securely tie the associated bundle and lock the strap 101 in the opening 260 in the identical manner as was described with respect to the locking frame 150. The outer end 102 of the strap 101 may then be looped about a second bundle or support in the manner described above and fed through the upper opening 280 from the rear end to the front end thereof. Since the front end of the opening 280 has dimensions substantially the same as the dimensions of the strap 101, the detent 290 will impede the passage of the strap 101 through the opening 280. However, by reason of the flexible nature of the bearing tab 255, the engagement of the surface 111 of the strap 101 with the strap-bearing surface 285 will serve to deflect the bearing tab 255 upwardly to permit the teeth 115 of the strap 101 to rachet over the detent 290 for thereby accommodating passage of the strap 101 through the opening 280 in a strap-tightening direction. After tightening of the strap 101 to a predetermined tension, release thereof will cause the strap 101 to be pulled into firm engagement with the detent 290 for securely locking the strap 101 in the locking frame 250 in the same manner as was described with respect to the embodiment of FIGS. 1 to 10.

Referring now to FIGS. 15 to 17 of the drawings, there is illustrated yet another embodiment 350 of the locking frame of the invention for use with the strap 101 illustrated in FIGS. 1 and 2. The locking frame 350 is substantially similar to the locking frame 250 and includes a front surface 353 and a rear surface 354 substantially parallel to the front surface 353, and a pair of opposed side surfaces 351 and 352 interconnecting the front and rear surfaces 353 and 354 at the opposite side edges thereof and converging slightly toward the rear surface 354. The locking frame 350 is also provided with a bottom surface 356 which slopes upwardly from the front surface 353 of the rear surface 354, and a flat top surface 357 disposed substantially normal to the front and rear surfaces 353 and 354. The top surface 357 is recessed a slight distance below the upper ends of the side surfaces 351 and 352, as is best illustrated in FIGS. 12 and 14. The locking frame 350 is also provided with lower and upper openings 360 and 380 respectively therethrough, the lower opening 360 being identical to the lower opening 360 in the embodiment of FIGS. 1 to 10. The openings 360 and 380 combine to divide the locking frame 350 into a pair of upstanding side walls 361 and 362 interconnected adjacent to the upper and lower ends thereby by a top wall 363 and a bottom wall 364, respectively, and interconnected intermediate the ends thereof by a center wall 365 which separates the opening 360 from the opening 380. As indicated above, the top surface 357 is recessed below the upper ends of the side surfaces 361 and 362 whereby the upper ends of the side walls 361 and 362 extend a short distance above the top surface 357 and define a pair of ridges 361a and 362a bordering the side edges of the top surface 357.

The bottom portion of the locking frame 350 including the center wall 365, the bottom opening 360 and the bottom wall 364, is identical to the corresponding bottom portion of the locking frame 150 illustrated in FIGS. 1 to 10 and will, therefore, not be described again in detail. The upper opening 380 is defined by a pair of opposed upstanding side surfaces 381 and 382, a strap-engaging surface 383 and a strap-bearing surface 385. The strap bearing surface 385 is substantially parallel to the top surface 357 and extends the length of the opening 380 from the rear surface 354 to the front surface 353. The strap-engaging surface 383 is inclined slightly upwardly from the rear surface 354 toward the front surface 353 and is provided at the front end thereof with a tooth or detent 390 extending into the opening 380 toward the strap-bearing surface 385. The front end of the opening 380 is shaped and dimensioned complementary to the strap 101, with the distance between the front end of the bearing surface 385 and the base of the detent 390 being substantially equal to the thickness of the strap 101.

The side surfaces 381 and 382 are each recessed at the upper front ends thereof to form a pair of notches 386 and 387, each of the notches 386 and 387 extending transversely outwardly to points underlying the opposite side edges of the top surface 357, and extending axially of the opening 380 to a point approximately midway between the front and rear surfaces 353 and 354. The notches 386 and 387 serve to undercut the opposite side edges of the top wall 363 at the front end thereof and facilitate deflection of the top wall 363.

In operation, the cooperation of the locking frame 350 with the strap 101 is essentially identical with that described in connection with the locking frame 250, the only difference being in the manner of deflection of the top wall 363. Since the dimensions of the strap 101 are substantially the same as the dimensions of the opening 380 at the front end thereof, the passage of the strap 101 through the opening 380 will be impeded by the detent 390. However, the engagement of the surface 111 of the strap 101 with the strap-bearing surface 385 will serve to deflect the undercut front end of the top wall 363 upwardly away from the strap-engaging surface 383 to permit the teeth 115 to ratchet over the detent 390 for thereby accommodating passage of the strap 101 through the opening 380 in the strap-tightening direction. It will be noted that the notches 386 and 387 serve to weaken the support at the opposite side edges of the top wall 363 to accommodate upward deflection of the top wall 383 as well as a slight inward deflection of the upper ends of side walls 361 and 362. When the strap 101 has been tightened to the desired tension, release thereof will serve to firmly engage the strap 101 with the detent 390 for securely locking the strap 101 in the locking frame 350.

In FIGS. 18 and 19, there is shown a fourth embodiment 450 of the locking frame of this invention for use with the strap 101 illustrated in FIGS. 1 and 2. The locking frame 450 is generally rectangular in shape and is provided with and includes a front surface 453 and a rear surface 454 substantially parallel to the front surface 453, and a pair of opposed side surfaces 451 and 452 interconnecting the front and rear surfaces 453 and 454 at the opposite side edges thereof and converging slightly toward the rear surface 454. The locking frame 450 is also provided with a bottom surface 456 which slopes upwardly from the front surface 453 to the rear surface 454, and a flat top surface 457 disposed substantially normal to the front and rear surfaces 453 and 454. The locking frame 450 is also provided with lower and upper openings 460 and 480, respectively therethrough, the lower opening 460 being identical to the lower opening 160 in the embodiment of FIGS. 1 to 10. The openings 460 and 480 combine to divide the locking frame 460 into a pair of upstanding side walls 461 and 462 interconnected adjacent to the upper and lower ends thereby by a top wall 463 and a bottom wall 464, respectively, and interconnected intermediate the ends thereof by a center wall 465 which separates the opening 460 from the opening 480. The bottom opening 460 is identical to the opening 160 in the embodiment of FIGS. 1 to 10 in both construction and function and the description thereof will not be here repeated. The upper opening 480 is defined by a pair of upstanding substantially parallel side surfaces 481 and 482, a lower surface 483 inclined downwardly from the rear surface 454 to the front surface 453, and a flat strap-bearing surface 485 disposed substantially parallel to the top surface 457. Connected to the lower surface 483 is a pawl, generally designated by the numeral 490, integral at the rear end thereof with a hinge connection 491 which is in turn formed integrally with the surface 483 adjacent to the upper rear end thereof. The pawl 490 extends forwardly of the hinge connection 491 into the opening 480 and is provided with a pair of side surfaces 492 and 493 disposed substantially parallel to the side surfaces 481 and 482 and spaced inwardly therefrom, a bottom or backing surface 494 and a front surface 496 disposed a slight distance rearwardly of the front surface 453 of the locking frame 450. The pawl 490 is also provided with a set of teeth 495 thereon, preferably three in number, and extending into the opening 480 toward the strap-bearing surface 485. The teeth 495 extend transversely of the pawl 490 and are shaped complementary to the teeth 115 on the strap 101. The pawl 490 is normally disposed with the bottom surface 494 thereof spaced a slight distance from the surface 483 and with the teeth 495 projecting into the opening 480 so that the distance between the strap-bearing surface 485 and the crests of the teeth 495 is less than the thickness of the strap 101.

In operation, the strap 101 cooperates with the locking frame 450 and, in particular, with the lower opening 460 therethrough, for securely tying a first bundle of wires or the like in exactly the same manner as was described with respect to the locking frame 150 in the embodiment of FIGS. 1 to 10. Similarly, the outer end 102 of the strap 101, may then be looped about a second bundle of wires in the manner as described above and inserted into the second opening 480 from the rear end to the front end thereof. Upon insertion into the opening 480, the teeth 115 of the strap 101 will engage the teeth 495 on the pawl 490, whereby the passage of the strap 101 through the opening 480 is impeded. However, the pawl 490 is pivotally movable about the hinge connection 491 so that the engagement of the strap 101 with the pawl 490 will move the pawl 490 downwardly toward the surface 483, thus permitting the teeth 115 to ratchet over the teeth 495, thereby allowing passage of the strap 101 through the opening 480 in a strap-tightening direction. It will be noted that there is sufficient clearance allowed between the surface 483 and the rear surface 494 of the pawl 490 to permit the teeth 495 to be moved substantially out of the path of the strap 101 to facilitate the ratcheting action described above. When the strap 101 has been tightened about the second bundle to the desired tension, the strap 101 may be released, whereupon the tension therein will tend to pull the strap 101 back through the opening 480 in a strap-loosening direction. This tendency toward retrograde motion through opening 480 will cause the teeth 115 on the strap 101 to move into more firm engagement with the teeth 495 on the pawl 490, thereby pulling the pawl 490 upwardly toward the strap-bearing surface 485 for securely wedging the strap 101 between the pawl 490 and the strap-bearing surface 485. In this manner, the strap 101 is securely locked in the opening 480 of the locking frame 450.

Referring now to FIGS. 20 and 21 of the drawings, there is illustrated a fifth embodiment 550 of the locking frame of this invention for use with the strap 101 illustrated in FIGS. 1 and 2. The locking frame 550 is shaped similarly to the locking frame 150 of the embodiment of FIGS. 1 to 10. Thus, the locking frame 550 includes a front surface 553 and a rear surface 554 substantially parallel to each other and interconnected at the opposite side edges thereof by a pair of opposed side surfaces 551 and 552. The locking frame 550 is also provided with two strap-accommodating openings therethrough, respectively designated 560 and 580, and serving to divide the locking frame 550 into a pair of opposed side walls 561 and 562, interconnected at the bottom ends thereof by a bottom wall (not shown) and an upper wall 565. The bottom portion of the locking frame 550 and, in particular, the opening 560 therethrough is identical in construction and function to the corresponding portion of the locking frame 150, whereby the description of the lower portions of the locking frame 550 will not be repeated here. Extending upwardly from the top wall 565 at the opposite sides thereof is a pair of upstanding posts 563 disposed adjacent to the rear end of the upper wall 565. There is also provided a bearing member, generally designated by the numeral 585, extending transversely of the locking frame 550 and having a pair of flat ends 586 pivotally connected to the posts 563 at pivot points 587. Preferably, the bearing member 585 is integral with the posts 563, the pivotal connection points 587 being portions of reduced diameter which are torsionally flexible to permit the pivotal movement of the bearing member 585 thereabout. The bearing member 585 is disposed above the upper wall 565 and cooperates therewith and with the posts 563 to define the second opening 580 through the locking frame 550. More specifically, the inner surfaces 581 and 582 of the posts 563 form the sides of the opening 580, the opening 580 also being bounded by a strap-engaging surface 583 on the upper wall 565. The bearing member 585 is provided with a short, flat bearing surface 588 thereon disposed in the opening 580 opposite to the strap-engaging surface 583 and defining the upper wall of the opening 580. The bearing member 585 is also provided adjacent to the rear end thereof with an abutment surface 589 inclined downwardly from the rear end of the bearing member 585 to the rear end of the strap-bearing surface 588.

The strap-engaging surface 583 is provided intermediate the front and rear ends thereof with a tooth or detent 590 extending transversely of the locking frame 550 and shaped complementary to the teeth 115 on the strap 101. The detent 590 extends into the opening 580 and toward the bearing member 585, whereby the opening 580 is shaped and dimensioned complementary to the strap 101, the distance between the strap-bearing surface 588 and the strap-engaging surface 583 in the normal position of the bearing member 585 being substantially the same as the thickness of the strap 101. It will be noted that the bearing member 585 is pivotally movable about the pivot connections 587 thereof between a strap-locking position illustrated in FIG. 20, wherein the strap-bearing surface 588 is disposed in the opening 580 toward the strap-engaging surface 583, and a strap-passing position (not shown) wherein the strap-bearing surface 588 is pivoted counterclockwise to a position disposed forwardly and away from the strap-engaging surface 583. In this strap-passing position of the bearing member 585, the abutment surface 589 thereof is disposed substantially parallel to the strap engaging surface 583. Integral with the bearing member 585 is a release tab or lever 595 extending rearwardly from the bearing member 585 and being provided at the rear end thereof with a plurality of ridges or serrations 596 to afford a gripping surface. Movement of the release tab 595 in a counterclockwise direction, as indicated in FIG. 20, will serve to move the bearing member 585 to the strap-passing position thereof.

In operation, the locking frame 550 cooperates with the strap 101 for locking the strap 101 about a first bundle of wires or the like in exactly the same manner as was described with respect to FIGS. 1 to 10 of the drawings. The outer end 102 of the strap 101 may then be looped around a second bundle of wires or the like and threaded back through the opening 580 toward the front end of the locking frame 550 as indicated in FIG. 20. The bearing member 585 is normally disposed in the strap-locking position thereof, whereby the bearing member 585 and the detent 590 will cooperate to impede the passage of the strap 101 through the opening 580. However, when the strap 101 engages the abutment surface 589 on the bearing member 585, it will serve to pivot the bearing member 585 in a counterclockwise direction to the strap-passing position thereof, thereby permitting the strap 101 to pass through the opening 580 with the teeth 115 ratcheting over the detent 590. When the strap 101 has been tightened about the second bundle to a predetermined tension, release of the tensioned strap 101 will result in the tension therein tending to pull the strap 101 back through the opening 580, thereby moving the teeth 115 into more firm engagement with the detent 590. The bearing member 585 will also return to its strap-locking position, with any tendency of the strap toward retrograde motion through the opening 580 serving to firmly wedge the strap 101 between the strap-bearing surface 588 and the strap engaging surface 583. If, for any reason, it is desired to release the strap 101 from the opening 580, it is only necessary to depress the release tab 595 in the direction indicated by the arrow in FIG. 20, whereupon the bearing member 585 will be pivoted to the strap-passing position thereof to permit free passage of the strap 101 through the opening 580.

Referring now to FIG. 11 of the drawings, there is illustrated another embodiment 600 of the cable tie of this invention comprising a strap 601 and a locking frame 650. The cable tie 600 is similar to the cable tie 100, whereby parts of the cable tie 600 which correspond to identical parts in the cable tie 100 have been given corresponding reference numerals in the 600 series. The strap 601 is substantially the same as the strap 101 illustrated in FIGS. 1 and 2, with the exception that the strap 601 is provided with two rows of teeth 610 and 615, respectively formed in the opposite surfaces 609 and 611 of the strap 601, each of the rows of teeth 610 and 615 being identical to the row of teeth 110 in the strap 101. Similarly, the locking frame 650 is substantially the same as the locking frame 150 described above, with the exception that the strap-engaging surface 685 is provided at the front end thereof with a second tooth or detent 695 shaped complementary to the teeth 615 on the strap 601 and extending into the opening 680 toward the detent 690. The operation of the cable tie 600 is substantially identical to the operation of cable tie 100, with the exception that there has been provided in the cable tie 600 the additional locking engagement of the detent 695 with the second row of teeth 615 to effect an even more firm and secure locking of the strap 601 in the opening 680 of the cable tie 600.

While the principle use of the cable tie of this invention is to afford a tying of a bundle of wires or the like to a support (which may be another bundle) by the use of only a single cable tie strap, there is illustrated in FIG. 22 another arrangement of the cable tie 100 for use with a second strap. In this arrangement, when the strap 101 has been securely locked about the first bundle 50 of wires 55, as described above, the outer end 102 of the strap 100 protruding beyond the rear end of the locking frame 150 may be cut off instead of being looped about the associated support. In this case, a second strap 80, which may be of integral single-piece construction is looped about the associated support 70, with the free end of the strap 80 being fed through the opening 180 in the locking frame 150 in the manner described above and then locked in a head 85 of the secondary strap 80 in a well-known manner.

From the foregoing, it will be appreciated that there has been provided a double-latch cable tie of simple and economical construction which is capable of tying two separate bundles with a single cable tie strap. More particularly, there has been provided a cable tie which includes a locking frame providing two separate locks for the associated strap for locking the associated cable tie about the two associated bundles.

There have also been provided several embodiments of a locking frame for use with the cable tie strap of this invention, including an embodiment which provides for manual release of the cable tie from one of the associated bundles. Another embodiment of the cable tie of this invention has been provided including a strap with two rows of teeth, each engageable with a corresponding detent on the locking frame.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A cable tie securable about two separate bundles of wires and the like, said cable tie comprising an elongated flexible strap, a row of teeth disposed on one longitudinal surface of said strap and arranged transversely with respect thereto, a wedge-shaped head connected at the smaller end thereof to one end of said strap and having a tooth thereon disposed transversely thereof and shaped substantially complementary to the teeth in said row of teeth, a locking frame having first and second strap-accommodating openings therein for receiving the other end of said strap therethrough, said first opening being shaped to receive said head therein and to prevent passage of said head therethrough and to simultaneously accommodate the other end of said strap therethrough, said strap being deformable into a first loop encircling a first bundle of wires with said strap accommodated in said first opening and with the other end of said strap extending back through said first opening and therebeyond, the tooth on said head being disposed toward said row of teeth and engageable therewith as said head is pulled into a wedging position in said first opening, any force tending to withdraw said strap from said first opening in a first loop strap-loosening direction serving to move the tooth on said head into more firm engagement with the engaged ones of said row of teeth to hold said head firmly in engagement with said frame, a strap-bearing surface on said frame in said second opening and a detent on said frame opposite said strap-bearing surface and disposed transversely thereof and shaped substantially complementary to the teeth in said row of teeth, said strap being further deformable into a second loop encircling a second bundle of wires with the other end of said strap extending through said second opening, said detent being disposed toward said row of teeth and sequentially engageable therewith as said strap is pulled through said second opening, and means urging said strap-bearing surface and said detent toward one another to move said detent into firm engagement with the engaged ones of said row of teeth to hold said strap firmly in said second opening for preventing retrograde motion of said strap in said second opening, whereby said cable tie serves to tie two separate bundles of wires and the like.

2. A cable tie securable about two separate bundles of wires and the like, said cable tie comprising an elongated flexible strap, a row of teeth disposed on one longitudinal surface of said strap and arranged transversely with respect thereto, a wedge-shaped head connected at the smaller end thereof to one end of said strap and having a tooth thereon disposed transversely thereof and shaped substantially complementary to the teeth in said row of teeth, an abutment projection extending laterally from said head, a locking frame having first and second strap-accommodating openings therein for receiving the other end of said strap therethrough, said first opening being shaped to receive said head therein and to simultaneously accommodate the other end of said strap therethrough, an abutment shoulder on said frame extending into said first opening and shaped complementary to said abutment projection for engagement therewith to prevent passage of said head through said first opening, said strap being deformable into a first loop encircling a first bundle of wires with said strap accommodated in said first opening and with the other end of said strap extending back through said first opening and therebeyond, the tooth on said head being disposed toward said row of teeth and engageable therewith as said head is pulled into a wedging position in said first opening when said strap is tightened about the first bundle of wires to a tensioned condition, any force tending to withdraw said strap from said first opening in a first loop strap-loosening direction serving to move the tooth on said head into more firm engagement with the engaged ones of said row of teeth to hold said head firmly in engagement with said frame, a strap-bearing surface on said frame in said second opening, a pawl carried by said frame and being resiliently urged into said second opening toward said strap-bearing surface, and a tooth on said pawl arranged transversely with respect thereto and shaped complementary to the teeth in said row of teeth, said strap being further deformable into a second loop encircling a second bundle of wires with the other end of said strap extending through said second opening, said tooth on said pawl being disposed toward said row of teeth and sequentially engageable therewith as said strap is pulled through said second opening, the tooth on said pawl moving into firm engagement with and remaining in firm engagement with said row of teeth upon release of said strap, any force tending to withdraw said strap from said second opening in a second loop strap-loosening direction serving to move the tooth on said pawl into more firm engagement with the engaged ones of said row of teeth firmly to wedge said strap between said strap-bearing surface and said pawl, whereby said cable tie serves to tie two separate bundles of wires and the like.

3. The cable tie set forth in claim 2, and further including a set of teeth on said pawl arranged transversely with respect thereto and shaped complementary to said row of teeth.

4. The cable tie set forth in claim 2, and further including a set of teeth on said pawl arranged transversely with respect thereto and shaped complementary to said row of teeth, the crests of said teeth in said set of teeth all lying in a common plane, said plane being disposed substantially parallel to said strap-bearing surface when said strap is in the secured condition thereof in said second opening.

5. A cable tie securable about two separate bundles of wires and the like, said cable tie comprising an elongated flexible strap, a row of teeth disposed on one longitudinal surface of said strap and arranged transversely with respect thereto, a wedge-shaped head connected at the smaller end thereof to one end of said strap and having a tooth thereon disposed transversely thereof and shaped substantially complementary to the teeth in said row of teeth, a locking frame having first and second strap-accommodating openings therein for receiving the other end of said strap therethrough, said first opening being shaped to receive said head therein and to prevent passage of said head therethrough and to simultaneously accommodate the other end of said strap therethrough, said strap being deformable into a first loop encircling a first bundle of wires with said strap accommodated in said first opening and with the other end of said strap extending back through said first opening and therebeyond, the tooth on said head being disposed toward said row of teeth and engageable therewith as said head is pulled into a wedging position in said first opening when said strap is tightened about the first bundle of wires to a tensioned condition, any force tending to withdraw said strap from said first opening in a first loop strap-loosening direction serving to move the tooth on said head into more firm engagement with the engaged ones of said row of teeth to hold said head firmly in engagement with said frame, a bearing member on said frame having a strap-bearing surface in said second opening and being pivotally movable between a strap-passing position and a strap-locking position a detent on said frame opposite said strap-bearing surface and disposed transversely thereof and shaped substantially complementary to the teeth in said row of teeth, said strap-bearing surface being disposed away from said detent when said bearing member is in the strap-passing position thereof for accommodating passage of said strap through said second opening, said strap-bearing surface being disposed toward said detent when said bearing member is in the strap-locking position thereof for restricting passage of said strap through said second opening, said strap being further deformable into a second loop encircling a second bundle of wires with the other end of said strap extending through said second opening, said detent being disposed toward said row of teeth and sequentially engageable therewith as said strap is pulled through said second opening, said bearing member being biased into the strap-locking position thereof for urging said strap-bearing surface and said strap toward said detent to move said row of teeth into firm engagement with said detent and to hold said strap firmly in said second opening for preventing retrograde motion of said strap into said second opening, and a release member coupled to said bearing member for effecting movement thereof to the strap-passing position thereof to release said strap from said second opening, whereby said cable tie serves to tie two separate bundles of wires and the like.

6. The cable tie set forth in claim 5, and further including an abutment surface on said bearing member and disposed in said second opening adjacent to one end thereof, the other end of said strap engaging said abutment surface when said strap is inserted into said second opening for moving said bearing member to the strap-passing position thereof to permit passage of said strap through said second opening in a strap-tightening direction.

7. A cable tie securable about two separate bundles of wires and the like and comprising an elongated flexible strap having an irregular configuration along a portion of the length thereof, a locking frame coupled to said strap adjacent to one end thereof and having first and second strap accommodating openings therein for receiving the other end of said strap therethrough, and first and second detents respectively positioned in said first and second strap accommodating openings and adapted to engage said strap irregular configuration, said strap being deformable into a first loop encircling a first bundle of wires with said other end of said strap extending through said first opening and therebeyond in a first loop-tightening direction, said first detent being disposed toward said strap irregular configuration and engageable therewith when said other end of said strap is extended through said first opening to prevent retrograde movement therebetween, said other end of said strap extending through and beyond said first opening being further deformable into a second loop encircling a second bundle of wires with said other end of said strap extending through said second opening and therebeyond in a second loop-tightening direction, said second detent being disposed toward said strap irregular configuration and engageable therewith when said other end of said strap is extended through said second opening to prevent retrograde movement therebetween, whereby said cable tie serves independently to tie two separate bundles of wires and the like.

8. A cable tie securable about two separate bundles of wires and the like, said cable tie comprising an elongated flexible strap, a row of teeth disposed on one longitudinal surface of said strap and arranged transversely with respect thereto, a wedge-shaped head connected at the smaller end thereof to one end of said strap and having a tooth thereon disposed transversely thereof and shaped substantially complementary to the teeth in said row of teeth, a locking frame having first and second strap-accommodating openings therein for receiving the other end of said strap therethrough, said first opening being shaped to receive said head therein and to prevent passage of said head therethrough and to simultaneously accommodate the other end of said strap therethrough, a retaining member carried by said strap adjacent to said one end thereof and engageable with said frame when said strap is accommodated in said first opening and cooperating with said head to trap said frame on said strap, said strap being deformable into a first loop encircling a first bundle of wires with said strap accommodated in said first opening and with the other end of said strap extending back through said first opening and therebeyond, the tooth on said head being disposed toward said row of teeth and engageable therewith as said head is pulled into a wedging position in said first opening, any force tending to withdraw said strap from said first opening in a first loop strap-loosening direction serving to move the tooth on said head into more firm engagement with the engaged ones of said row of teeth to hold said head firmly in engagement with said frame, a strap-bearing surface on said frame in said second opening, and a detent on said frame opposite said strap-bearing surface and disposed transversely thereof and shaped substantially complementary to the teeth in said row of teeth, said strap being further deformable into a second loop encircling a second bundle of wires with the other end of said strap extending through said second opening, said detent being disposed toward said row of teeth and sequentially engageable therewith as said strap is pulled through said second opening, and means urging said strap-bearing surface and said detent toward one another to move said detent into firm engagement with the engaged ones of said row of teeth to hold said strap firmly in said second opening for preventing retrograde motion of said strap in said second opening, whereby said cable tie serves to tie two separate bundles of wires and the like.

9. The cable tie set forth in claim 8, and further including a set of teeth on said head disposed transversely thereof and shaped substantially complementary to said row of teeth.

10. The cable tie set forth in claim 8, wherein said detent is fixed on said frame, said urging means biasing said strap-bearing surface toward said fixed detent.

11. The cable tie set forth in claim 8, wherein said strap-bearing surface is fixed on said frame, said urging means biasing said detent toward said fixed strap-bearing surface.

12. A cable tie securable about two separate bundles of wires and the like, said cable tie comprising an elongated flexible strap, a row of teeth disposed on one longitudinal surface of said strap and arranged transversely with respect thereto, a wedge-shaped head connected at the smaller end thereof to one end of said strap and having a tooth thereon disposed transversely thereof and shaped substantially complementary to the teeth in said row of teeth, a locking frame having first and second strap-accommodating openings therein for receiving the other end of said strap therethrough, said first opening being shaped to receive said head therein and to prevent passage of said head therethrough and simultaneously to accommodate the other end of said strap therethrough, said strap being deformable into a first loop encircling a first bundle of wires with said strap accommodated in said first opening and with the other end of said strap extending back through said first opening and therebeyond, the tooth on said head being disposed toward said row of teeth and engageable therewith as said head is pulled into a wedging position in said first opening, any force tending to withdraw said strap from said first opening in a first loop strap-loosening direction serving to move the tooth on said head into more firm engagement with the engaged ones of said row of teeth to hold said head firmly in engagement with said frame, a flexible bearing member on said frame having a strap-bearing surface in said second opening, a strap-engaging surface on said frame disposed in said second opening opposite said strap-bearing surface, one end of said strap-engaging surface extending axially of said second opening beyond the adjacent end of said strap-bearing surface, and a detent disposed on said strap-engaging surface adjacent to said one end thereof and opposite the adjacent end of said strap-bearing surface, said detent being disposed transversely of said strap-bearing surface and being shaped substantially complementary to the teeth in said row of teeth, said strap being further deformable into a second loop encircling a second bundle of wires with the other end of said strap extending through said second opening, said detent being disposed toward said row of teeth and sequentially engageable therewith as said strap is pulled through said second opening, said bearing member resiliently urging said strap-bearing surface and said strap toward said detent for moving said row of teeth into firm engagement with said detent to hold said strap firmly in said second opening for preventing retrograde motion of said strap in said second opening, whereby said cable tie serves to tie two separate bundles of wires and the like.

13. A cable tie securable about two separate bundles of wires and the like, said cable tie comprising an elongated flexible strap, a row of teeth disposed on one longitudinal surface of said strap and arranged transversely with respect thereto, a wedge-shaped head connected at the smaller end thereof to one end of said strap and having a tooth thereon disposed transversely thereof and shaped substantially complementary to the teeth in said row of teeth, a locking frame having first and second strap-accommodating openings therein for receiving the other end of said strap therethrough, said first opening being shaped to receive said head therein and to prevent passage of said head therethrough and to simultaneously accommodate the other end of said strap therethrough, said strap being deformable into a first loop encircling a first bundle of wires with said strap accommodated in said first opening and with the other end of said strap extending back through said first opening and therebeyond, the tooth on said head being disposed toward said row of teeth and engageable therewith as said head is pulled into a wedging position in said first opening, any force tending to withdraw said strap from said first opening in a first loop strap-loosening direction serving to move the tooth on said head into more form engagement with the engaged ones of said row of teeth to hold said head firmly in engagement with said frame, a flexible bearing member on said frame having a strap-bearing surface in said second opening, a strap-engaging surface on said frame disposed in said second opening opposite said strap-bearing surface and coterminous therewith in a direction axially of said second opening, and a detent on said frame disposed in said second opening at one end thereof opposite said strap-bearing surface and disposed transversely thereof and shaped substantially complementary to the teeth in said row of teeth, said strap-bearing surface being connected to said frame along the entire length of said second opening, said frame being provided with a pair of recesses beneath the opposite side edges of said strap-bearing surface at one end of said second opening to facilitate deflection of said strap-bearing surface by said strap in said second opening, said strap being further deformable into a second loop encircling a second bundle of wires with the other end of said strap extending through said second opening, said detent being disposed toward said row of teeth and sequentially engageable therewith as said strap is pulled through said second opening, said bearing member resiliently urging said strap-bearing surface and said strap toward said detent for moving said row of teeth into firm engagement with said detent to hold said strap firmly in said second opening for preventing retrograde motion of said strap in said second opening, whereby said cable tie serves to tie two separate bundles of wires and the like.

14. A cable tie securable about two separate bundles of wires and the like, said cable tie comprising an elongated flexible strap, a row of teeth disposed on one longitudinal surface of said strap and arranged transversely with respect thereto, a wedge-shaped head connected at the smaller end thereof to one end of said strap and having a tooth thereon disposed transversely thereof and shaped substantially complementary to the teeth in said row of teeth, a locking frame having first and second strap-accommodating openings therein for receiving the other end of said strap therethrough, said first opening being shaped to receive said head therein and to prevent passage of said head therethrough and to simultaneously accommodate the other end of said strap therethrough, said strap being deformable into a first loop encircling a first bundle of wires with said strap accommodated in said first opening and with the other end of said strap extending back through said first opening and therebeyond, the tooth on said head being disposed toward said row of teeth and engageable therewith as said head is pulled into a wedging position in said first opening when said strap is tightened about the first bundle of wires to a tensioned condition, any force tending to withdraw said strap from said first opening in a first loop strap-loosening direction serving to move the tooth on said head into more firm engagement with the engaged ones of said row of teeth to hold said head firmly in engagement with said frame, a bearing bar having a strap-bearing surface in said second opening, said bar extending transversely of said second opening and connected at the opposite ends thereof to said frame for pivotal movement about an axis extending transversely of said second opening between a strap-passing position and a strap-locking position, a detent on said frame opposite said strap-bearing surface and disposed transversely thereof and shaped substantially complementary to the teeth in said row of teeth, said strap-bearing surface being disposed away from said detent when said bearing bar is in the strap-passing position thereof for accommodating passage of said strap through said second opening, said strap-bearing surface being disposed toward said detent when said bearing member is in the strap-locking position thereof for restricting passage of said strap through said second opening, said strap being further deformable into a second loop encircling a second bundle of wires with the other end of said strap extending through said second opening, said detent being disposed toward said row of teeth and sequentially engageable therewith as said strap is pulled through said second opening, said bearing bar being biased into the strap-locking position thereof for urging said strap-bearing surface and said strap toward said detent to move said row of teeth into firm engagement with said detent and to hold said strap firmly in said second opening for preventing retrograde motion of said strap into said second opening, and a release lever coupled to said bearing bar for effecting movement thereof to the strap-passing position thereof to release said strap from said second opening, whereby said cable tie serves to tie two separate bundles of wires and the like.

15. A cable tie securable about two separate bundles of wires and the like, said cable tie comprising an elongated flexible strap, a row of teeth disposed on one longitudinal surface of said strap and arranged transversely with respect thereto, a wedge-shaped head connected at the smaller end thereof to one end of said strap and having a tooth thereon disposed transversely thereof and shaped substantially complementary to the teeth in said row of teeth, a locking frame having first and second strap-accommodating openings therein for receiving the other end of said strap therethrough, said first opening being shaped to receive said head therein and to prevent passage of said head therethrough and to simultaneously accommodate the other end of said strap therethrough, said strap being deformable into a first loop encircling a first bundle of wires with said strap accommodated in said first opening and with the other end of said strap extending back through said first opening and therebeyond, the tooth on said head being disposed toward said row of teeth and engageable therewith as said head is pulled into a wedging position in said first opening when said strap is tightened about the first bundle of wires to a tensioned condition, any force tending to withdraw said strap from said first opening in a first loop strap-loosening direction serving to move the tooth on said head into more firm engagement with the engaged ones of said row of teeth to hold said head firmly in engagement with said frame, a bearing member on said frame having a strap-bearing surface in said second opening and being pivotally movable between a strap-passing position and a strap-locking position, a detent on said frame opposite said strap-bearing surface and disposed transversely thereof and shaped complementary to the teeth in said row of teeth, said strap-bearing surface being disposed away from said detent when said bearing member is in the strap-passing position thereof for accommodating passage of said strap through said second opening, said strap-bearing surface being disposed toward said detent when said bearing member is in the strap-locking position thereof for restricting passage of said strap through said second opening, said strap being further deformable into a second loop encircling a second bundle of wires with the other end of said strap extending through said second opening, said detent being disposed toward said row of teeth and sequentially engageable therewith as said strap is pulled through said second opening when said strap is tightened about the second bundle of wires to a tensioned condition, said bearing member being biased into the strap-locking position thereof for urging said strap-bearing surface and said strap toward said detent to move said row of teeth into firm engagement with said detent and to hold said strap firmly in said second opening for preventing retrograde motion of said strap into said second opening, and a release lever connected at one end thereof to said bearing member, movement of the other end of said lever in a predetermined direction causing pivotal movement of said bearing member from the strap-locking position thereof to the strap-passing position thereof, whereby said cable tie serves to tie two separate bundles of wires and the like.

16. A cable tie comprising an elongated flexible strap, a row of teeth disposed on one longitudinal surface of said strap and arranged transversely with respect thereto, a head connected on one end of said strap, a locking frame having a first and second strap accommodating openings therein for receiving the other end of said strap therethrough, said first opening being shaped to receive said head therein and to prevent passage of said head therethrough, a retaining member carried by said strap adjacent to said one end thereof and engageable with said frame when said strap is accommodated in said first opening and cooperating with said head to trap said frame on said strap, a strap bearing surface on said frame in said second opening, and a detent on said frame opposite said strap bearing surface and disposed transversely thereof and shaped substantially complementary to the teeth in said row of teeth, said strap being deformable into a loop encircling a bundle of wires and the like with said head accommodated in said first opening and with the other end of said strap extending through and beyond said first opening and around the bundle of wires and then through said second opening, said detent being disposed toward said row of teeth and sequentially engageable therewith as said strap is pulled through said second opening for tightening the loop around the bundle of wires, and means urging said strap bearing surface and said detent toward each other to move said detent into firm engagement with the engaged ones of said row of teeth to hold said strap firmly in said second opening for preventing retrograde motion of said strap in said second opening, whereby said cable tie may be effectively secured about a bundle of wires and the like.

* * * * *